(12) United States Patent
Ishida et al.

(10) Patent No.: US 7,549,496 B2
(45) Date of Patent: Jun. 23, 2009

(54) ENGINE MOUNTING ARRANGEMENT FOR TWO WHEELED VEHICLE

(75) Inventors: Yousuke Ishida, Shizuoka-ken (JP); Akifumi Oishi, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 525 days.

(21) Appl. No.: 11/287,518

(22) Filed: Nov. 23, 2005

(65) Prior Publication Data

US 2006/0090944 A1    May 4, 2006

Related U.S. Application Data

(63) Continuation-in-part of application No. 11/260,712, filed on Oct. 27, 2005.

(30) Foreign Application Priority Data

Oct. 29, 2004  (JP) ............................. 2004-315988
Nov. 24, 2004  (JP) ............................. 2004-339034

(51) Int. Cl.
*B62D 61/00*  (2006.01)
*B62K 11/00*  (2006.01)
*B62M 7/00*   (2006.01)

(52) U.S. Cl. ................ 180/228; 180/219; 180/227; 180/230

(58) Field of Classification Search ............... 180/219, 180/228, 230
See application file for complete search history.

(56) References Cited

U.S. PATENT DOCUMENTS 3,811,528 A * 5/1974 Hooper ..................... 180/228
7,044,253 B2 * 5/2006 Takenaka et al. ........... 180/219

FOREIGN PATENT DOCUMENTS

JP    A 2001-3723    1/2001

* cited by examiner

*Primary Examiner*—Paul N Dickson
*Assistant Examiner*—Marc A Scharich
(74) *Attorney, Agent, or Firm*—Knobbe, Martens, Olson & Bear, LLP

(57) ABSTRACT

A two wheeled vehicle has a frame assembly. The frame assembly comprises a backbone style frame. A power unit is mounted to the frame. A space is defined between the power unit and the frame such than an auxiliary component can be positioned within the space.

22 Claims, 8 Drawing Sheets

US 7,549,496 B2

ENGINE MOUNTING ARRANGEMENT FOR TWO WHEELED VEHICLE

CROSS-REFERENCE TO RELATED APPLICATIONS

This application is a continuation-in-part of U.S. patent application Ser. No. 11/260,712, filed on Oct. 27, 2005 and titled MOTORCYCLE WITH LOWERED CENTER OF GRAVITY, which claimed the priority benefit of Japanese Application No. 2004-315,988 filed on Oct. 29, 2004, each of which is hereby incorporated by reference in its entirety. This application also claims the priority benefit of Japanese Application No. 2004-339,034, filed on Nov. 24, 2004, which is hereby incorporated by reference in its entirety.

BACKGROUND OF THE INVENTION

1. Field of the Invention

The present invention generally relates to a motorcycle or scooter comprising an engine suspended from a main frame member that extends rearward from a steering head pipe.

2. Description of the Related Art

Motorcycles and scooters mainly used for commuting or business purpose generally comprise a backbone type frame. The frame comprises a steering head pipe that supports a front fork. The frame also comprises a main frame member that extends rearward from the steering head pipe.

In such vehicles, the main frame member typically forms the primary frame structure. Brackets can be provided along an intermediate portion of the main frame member and the engine can be suspended from those brackets. As can be imagined, the brackets generally protrude downward from the main frame member. As such, the lower edges of the brackets extend longitudinally along a top face of the crankcase. As example of such a construction is shown in JP-A-2001-3723, in which the front ends and the rear ends of the brackets are connected to the crankcase.

As shown, a space is defined between the top face of the crankcase and the main frame member and this space is generally the same as the height of the brackets. When the motorcycle is viewed from the side, this space is generally enclosed by the brackets. Accordingly, if an auxiliary component for the engine, such as a start motor, were to be positioned on the crankcase of the engine in the proximity of the brackets, the brackets would necessarily be displaced upward by an amount corresponding to the volume or vertical dimension of the auxiliary component. The upward displacement results in an increase in distance between the crankcase and the main frame member.

The vertical position of the engine above the road surface is normally determined by, for example, a tradeoff with the angle of a road banking over which the vehicle can be ridden without causing the engine to bottom on the road surface. Thus, in order to maintain the engine at a desired distance from the ground, the spacing between the ground and the main frame member tends to be enlarged because the position of the main frame member is largely determined based on the vertical position of the engine. The seat is mounted to the main frame member. Therefore, because the spacing between the ground and the main frame member is fairly large, the seat is even further spaced from the ground. The seat, then, is positioned fairly high on the vehicle, which makes it difficult for a rider to put both feet on the ground easily.

SUMMARY OF THE INVENTION

It is, therefore, an object of certain embodiments of the present invention to provide a motorcycle that allows the main frame member to be lowered while still suspending a power unit and providing ample space for an auxiliary component between a case of the power unit and the main frame member.

Accordingly, one aspect of the present invention involves a motorcycle that comprises a steering head pipe with a main frame member extending rearward from the steering head pipe. A power unit comprises a case that is suspended from the main frame member. The case of the power unit comprises a top face. The top face is spaced from the main frame member along a longitudinally-extending segment of the main frame member and a functional component of the power unit is located between the top face of the case and the main frame member.

Another aspect of the present invention involves a motorcycle that comprises a steering head pipe with a main frame member extending rearward from the steering head pipe. The main frame member comprises a forward-facing side. A power unit comprises a case located generally vertically below the main frame member. The power unit comprises an auxiliary component and a case. The case comprises a top face that comprises a front portion. The case of the power unit and the main frame member together define a space that expands toward the forward-facing side of the main frame member. The front portion of the top face of the case faces the space and is formed with a boss. The boss is suspended from the main frame member and the auxiliary component being positioned within the space.

BRIEF DESCRIPTION OF THE DRAWINGS

These and other features, aspects and advantages of the present invention will be described with reference to several figures. The figures comprise 8 drawings.

DETAILED DESCRIPTION OF THE PREFERRED EMBODIMENT

Figure 1:
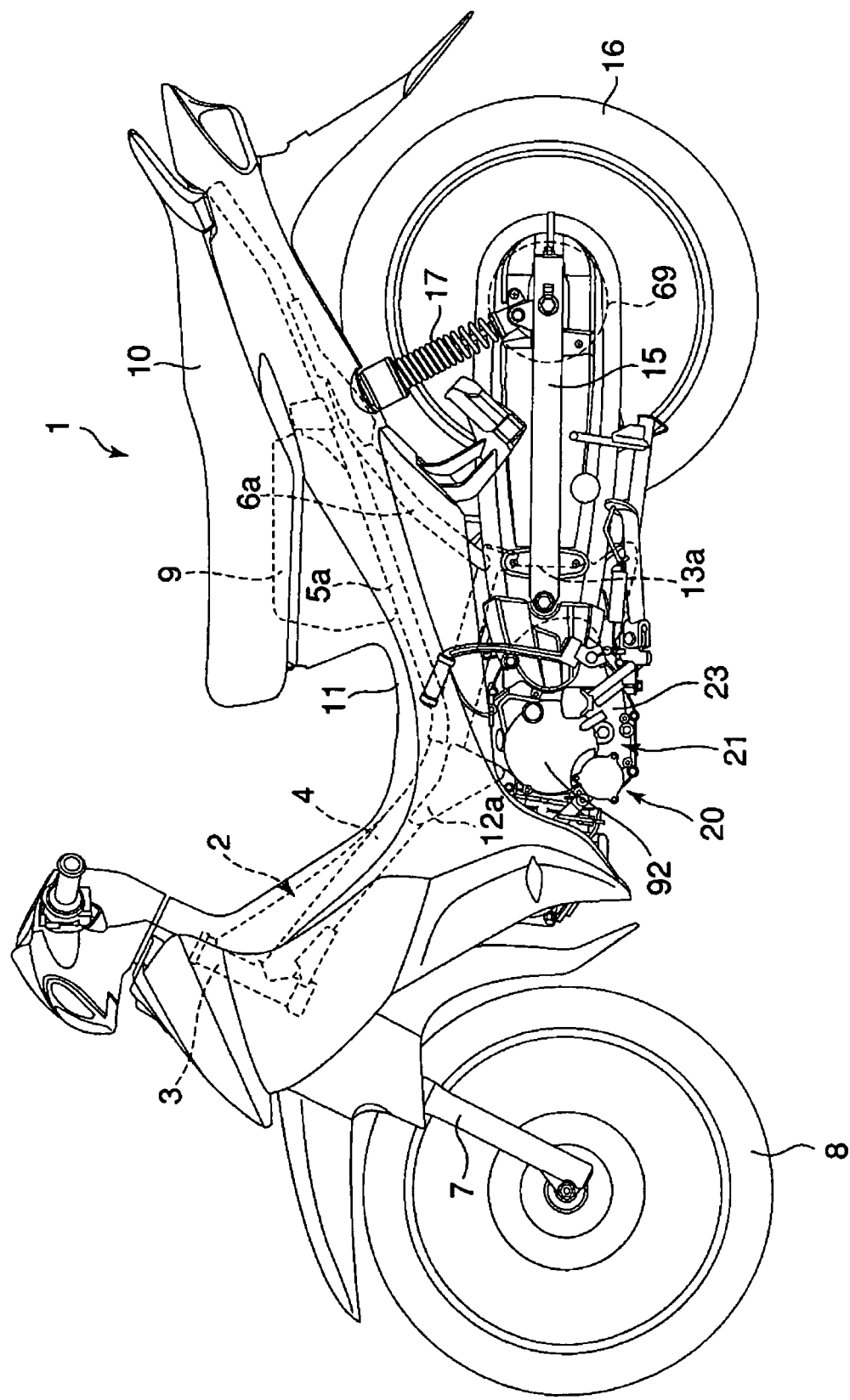
FIG. 1 is a side view of a motorcycle that is arranged and configured in accordance with certain features, aspects and advantages of the present invention.

With reference initially to FIG. 1, a motorcycle 1 preferably comprises a backbone type frame 2. While the illustrated vehicle comprises a motorcycle or scooter, certain features, aspects and advantages of the present invention may also find utility with other types of vehicles. In particular, certain features, aspects and advantages of the present invention may find utility with other vehicles having a low slung engine that is supported by a central frame member.

As illustrated, the steering head pipe 3 is located at the front end of the frame 2. The steering head pipe 3 supports a front wheel 8 via a front fork 7. A main frame member 4 extends rearward of the steering head pipe 3. The main frame member 4 can be secured to the steering head pipe 3 in any suitable manner. In one configuration, the main frame member 4 is welded to the steering head pipe 3. The main frame member 4 preferably defines the primary structure of the frame 2 and can be made of any suitable material, such as, for example but without limitation, a steel pipe having a generally circular cross-section. In some configurations, the main frame member 4 can have the shape of a box in cross section and/or can be formed by welding together components formed by press forming or extrusion, for example. Other materials and shapes also can be used. Moreover, the main frame member 4 need not be formed of a single pipe but can be formed of two or more pipes or a forked pipe that defines two or more branches that are united at one end.

A right seat rail 5a and a left seat rail 5b extend rearward from an intermediate portion of the illustrated main frame member 4. The seat rails 5a, 5b can be secured to the main frame member in any suitable manner. In the illustrated configuration, the seat rails 5a, 5b are welded to the main frame member 4. The seat rails 5a, 5b preferably are spaced from each other in the transverse (i.e., vehicle width) direction.

A right seat pillar tube 6a and a left seat pillar tube 6b connect a rear portion of the main frame member 4 and intermediate portions of the seat rails 5a, 5b. The seat pillar tubes 6a, 6b advantageously support the seat rails 5a, 5b from below. The seat pillar tubes can be secured in position in any suitable manner. In one configuration, the seat pillar tubes 6a, 6b can be welded to the seat rails 5a, 5b.

A fuel tank 9 and a rider's seat 10 are supported on the seat rails 5a, 5b. The fuel tank 9 preferably is located on the front halves of the illustrated seat rails 5a, 5b. The seat 10 extends from a position generally vertically above the fuel tank 9 toward the rear ends of the seat rails 5a, 5b. In the illustrated configuration, the fuel tank 9 and the frame 2 are covered with a body cover 11.

Figure 2:
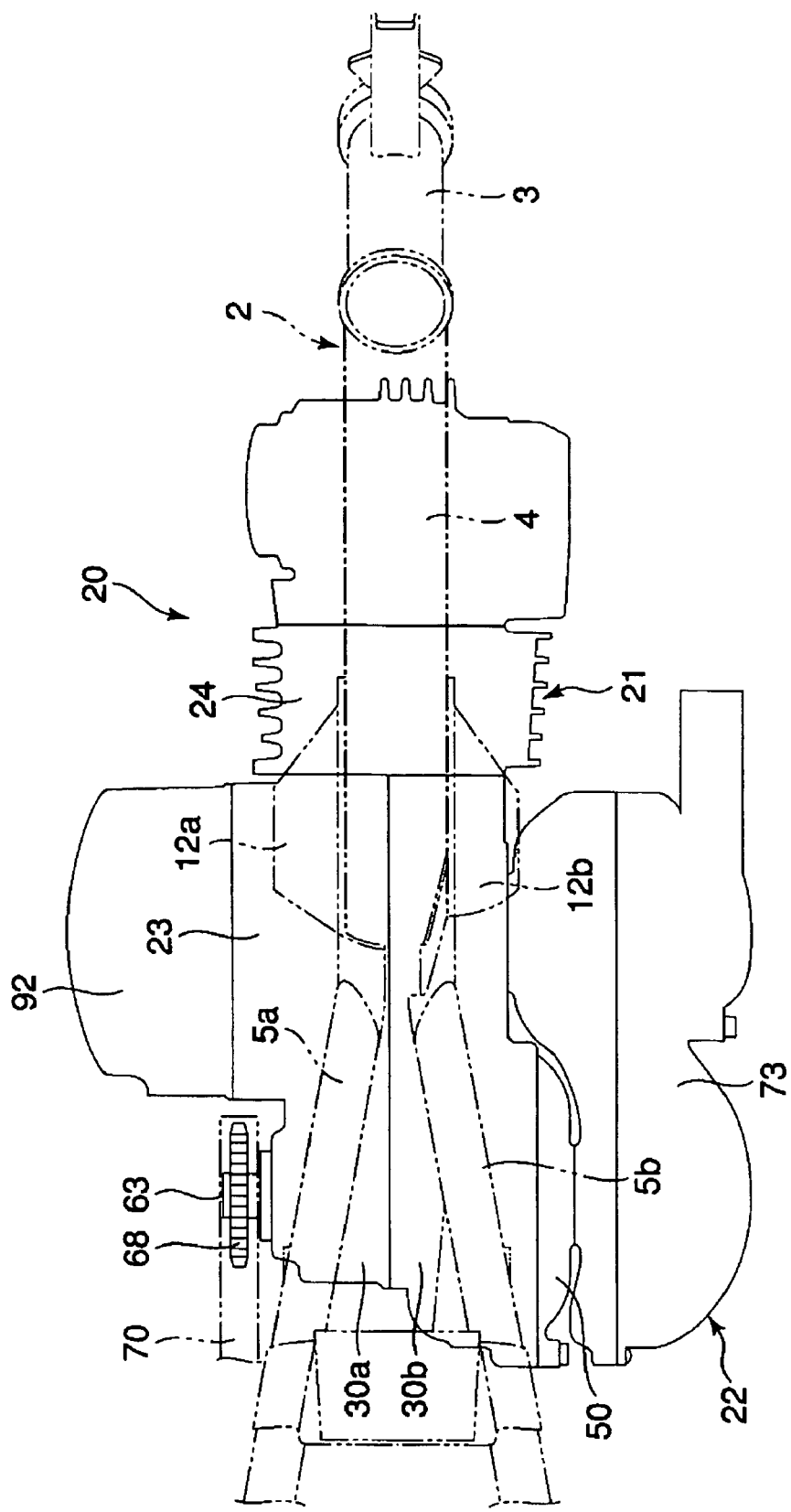
FIG. 2 is a top plan view of a portion of the motorcycle of FIG. 1, which view illustrates a relative positioning between a frame and a power unit.
Figure 3:
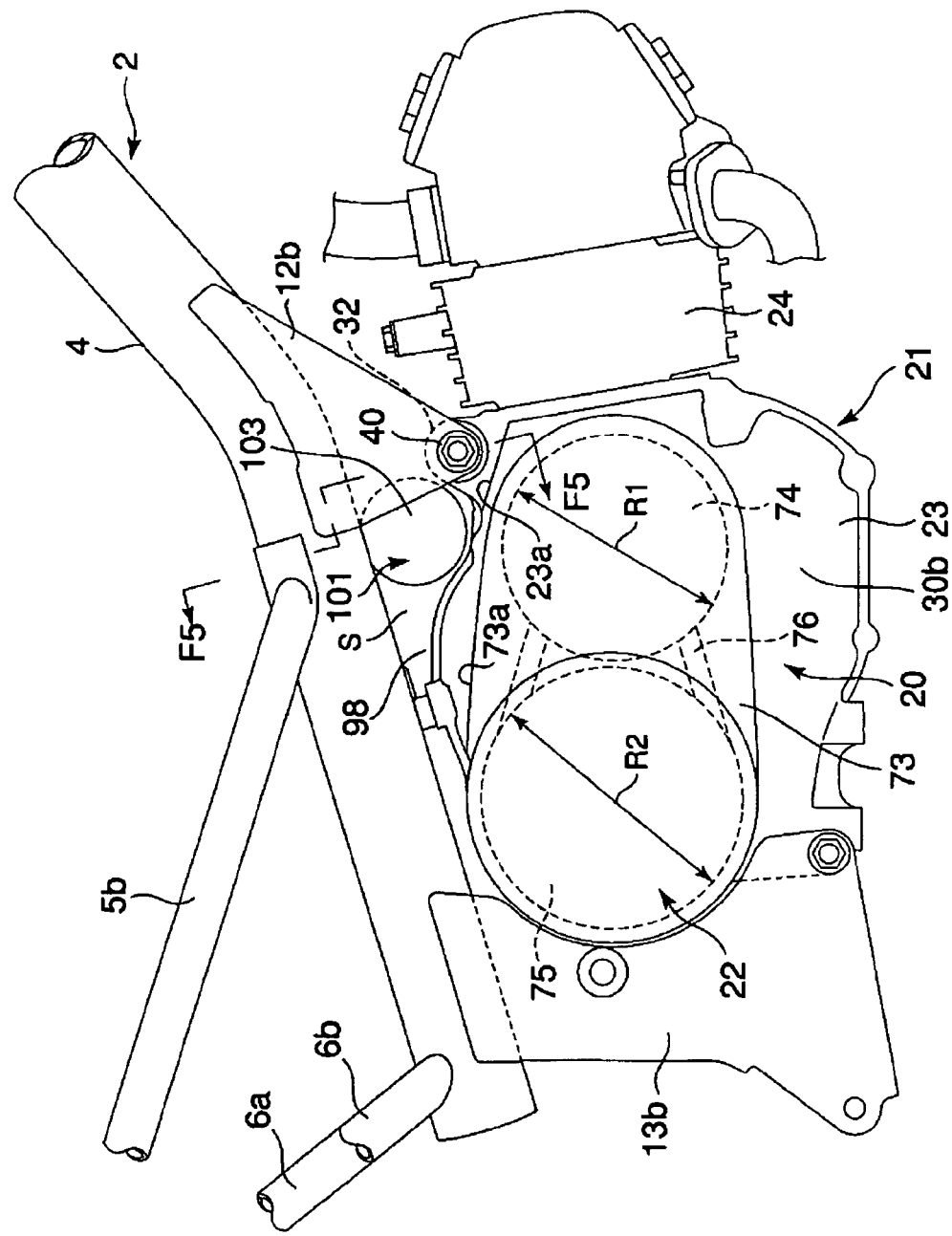
FIG. 3 is a right side elevation view of a portion of the motorcycle of FIG. 1, which view illustrates the relative positioning between the frame and the power unit.
Figure 4:
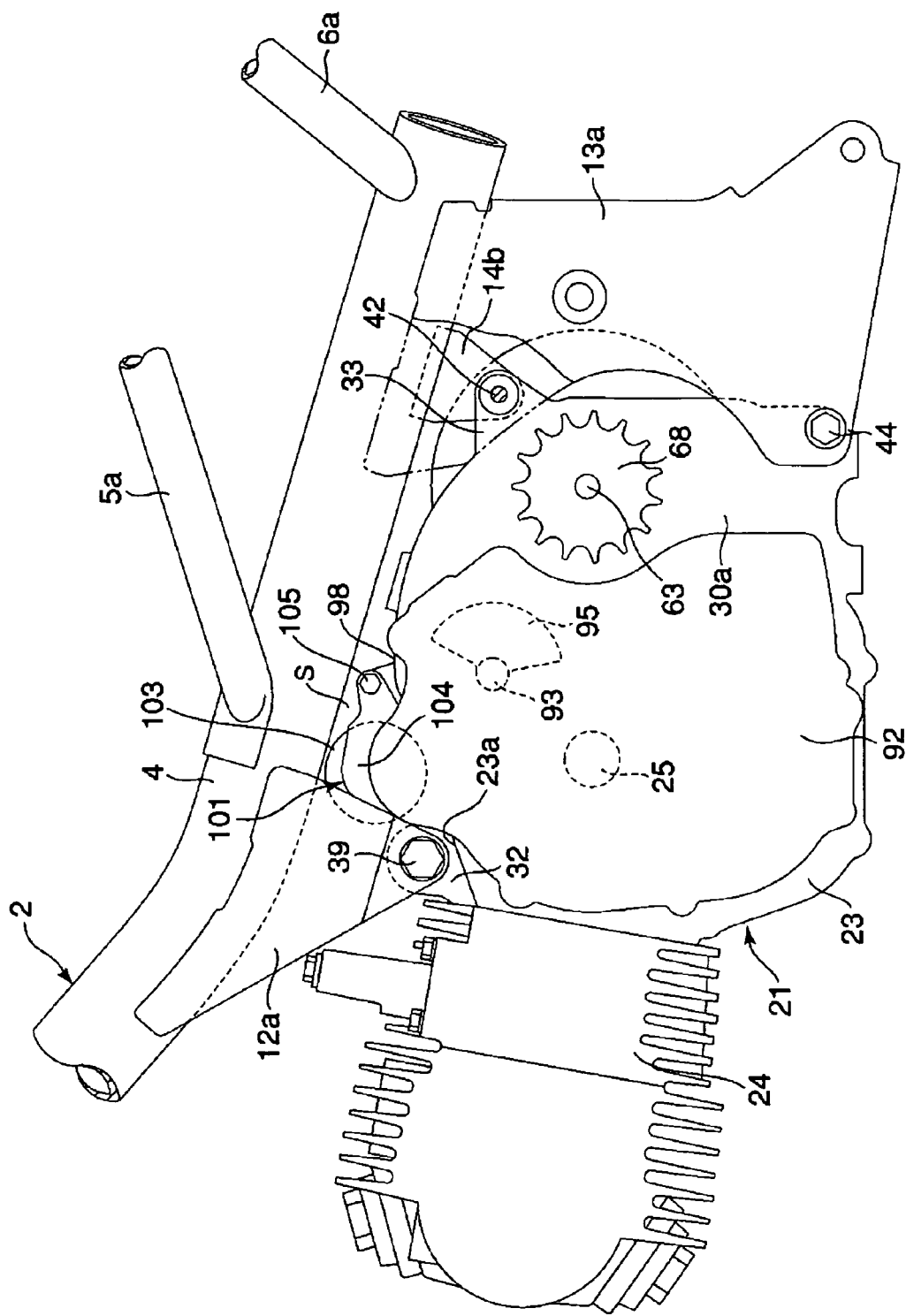
FIG. 4 is a left side elevation view of the portion of the motorcycle of FIG. 1.
Figure 5:
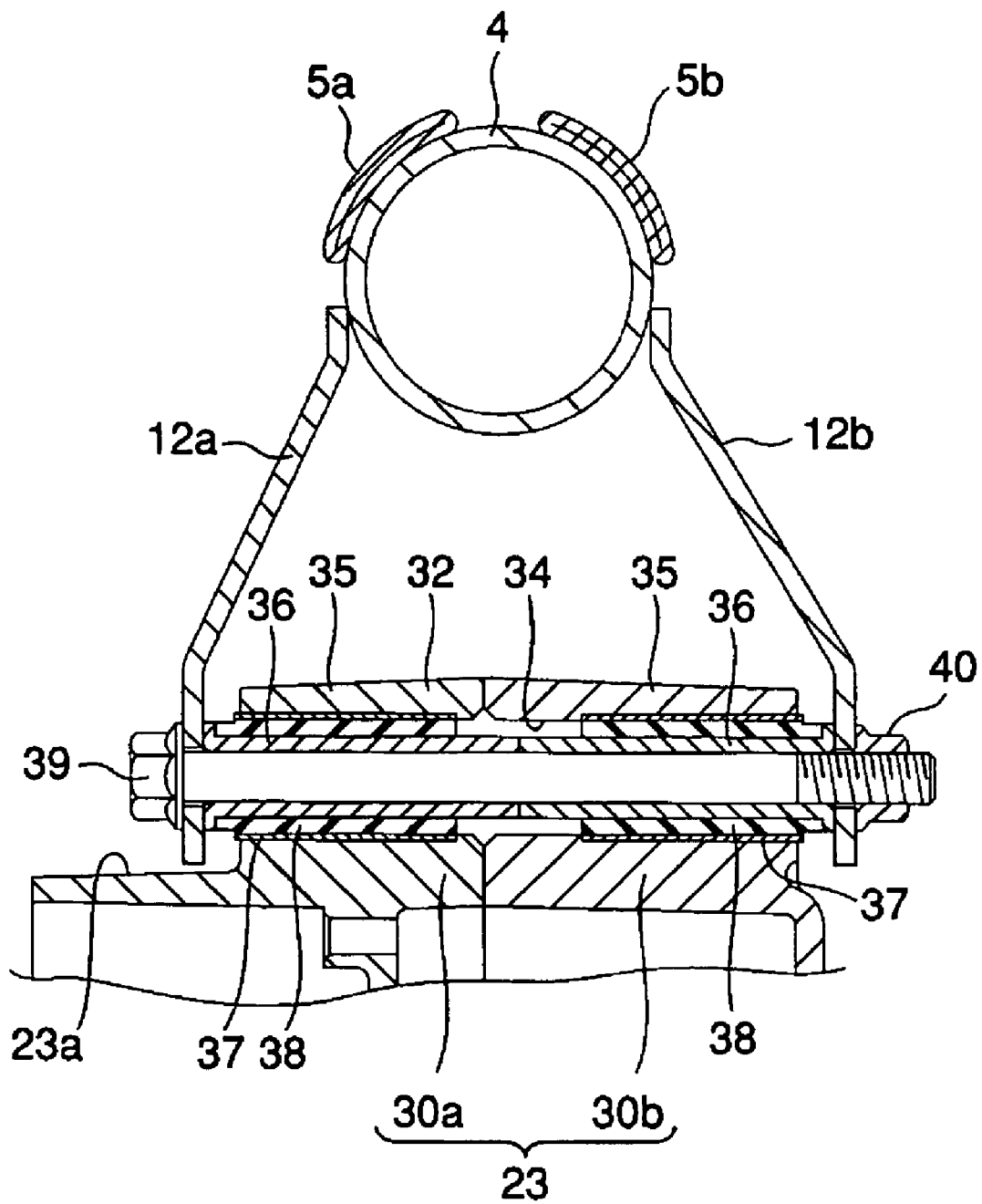
FIG. 5 is a section view taken along the line F5-F5 in FIG. 3.

With reference now to FIGS. 2 through 4, a pair of first engine brackets 12a, 12b can be secured to an intermediate portion of the main frame member 4. The first engine brackets 12a, 12b preferably depend downward from the intermediate portion of the main frame member 4. The first engine brackets are separated from each other in a direction that is generally transverse to the longitudinal direction defined by the main frame member 4. A space, therefore, is defined between the first engine brackets 12a, 12b, which space is best shown in FIG. 5.

With reference to FIGS. 3 and 4, a pair of rear arm brackets 13a, 13b and a pair of second engine brackets 14a, 14b preferably are secured to a rear portion of the main frame member 4. The illustrated rear arm brackets 13a, 13b depend downward from the rear portion of the main frame member 4. The rear arm brackets 13a, 13b preferably extend generally in the same direction and are spaced from each other in the transverse direction of the vehicle.

The illustrated rear arm brackets 13a, 13b are designed and configured to support a rear arm 15. The rear arm 15 extends rearward of the rear arm brackets 13a, 13b, and a rear wheel 16 is supported at the rear end of the rear arm 15. Preferably, at least a portion of the rear arm 15 is connected to the frame 2 with a shock absorber or the like. In the illustrated configuration, the rear end of the rear arm 15 is connected to the frame 2 by an oil damper 17 or any other suitable suspension component.

Figure 6:
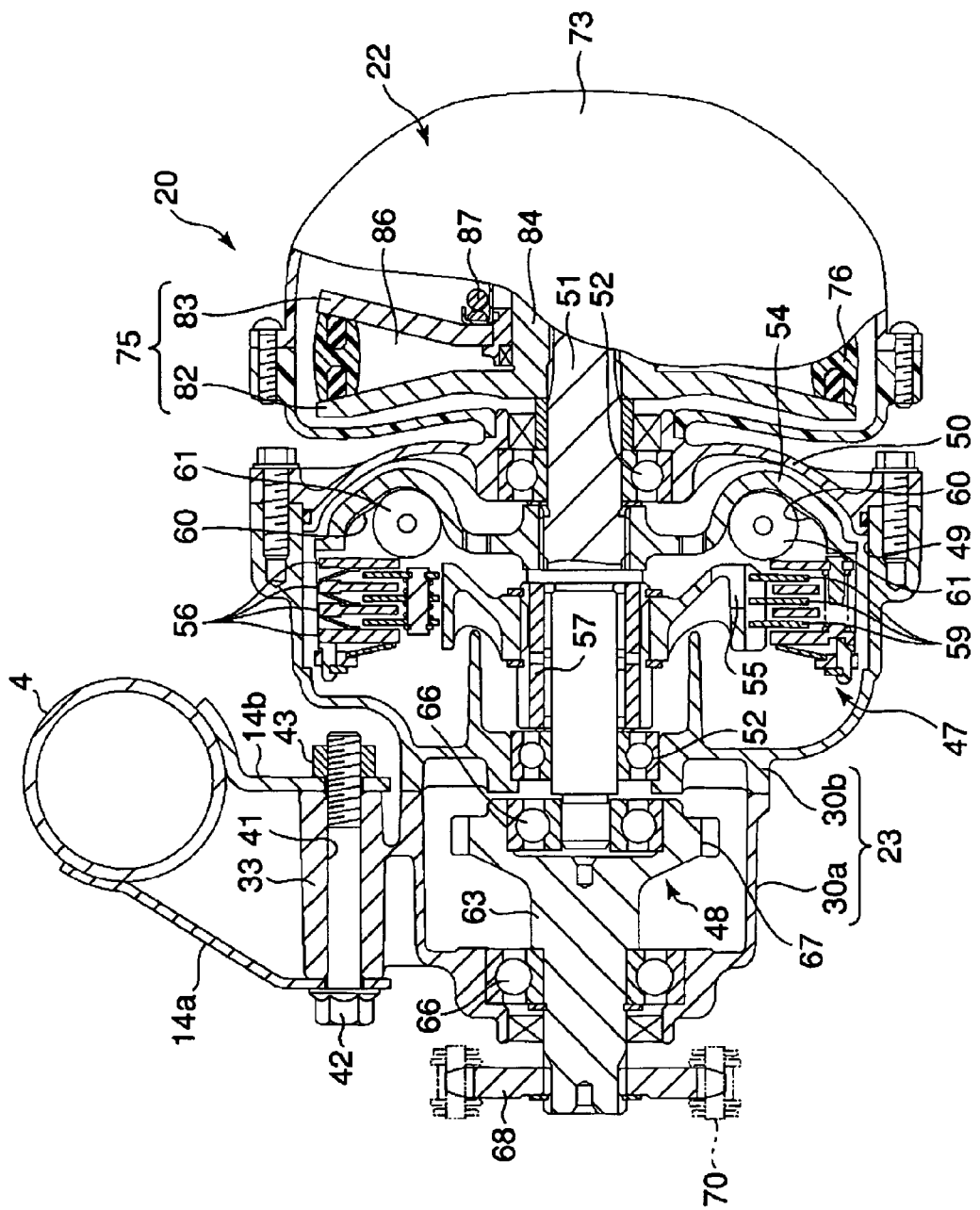
FIG. 6 is a partially sectioned view that illustrates the relative position among a second set of engine brackets for suspending a rear part of a crankcase, a secondary sheave of a belt-driven continuously variable transmission and a centrifugal clutch in the illustrated power unit.

With continued reference to FIG. 4, the illustrated second engine brackets 14a, 14b are located between the front ends of the rear arm brackets 13a, 13b. As shown in FIG. 6, the second engine brackets 14a, 14b also depend downward from the rear portion of the main frame member 4. The second engine brackets 14a, 14b preferably extend generally in the same direction as each other and are spaced from each other in the transverse direction of the vehicle.

The illustrated frame 2 supports a power unit 20 that is used to drive the rear wheel 16. The power unit 20 has, for example, a four-cycle single-cylinder engine 21 as a drive source and a belt-driven continuously variable transmission (hereinafter referred to as CVT) 22. Any other suitable engine configuration and any other suitable transmission arrangement can be used. For instance, the power unit may comprise an electric or hydraulic motor or a hybrid module in which a motor and an engine are combined.

Figure 7:
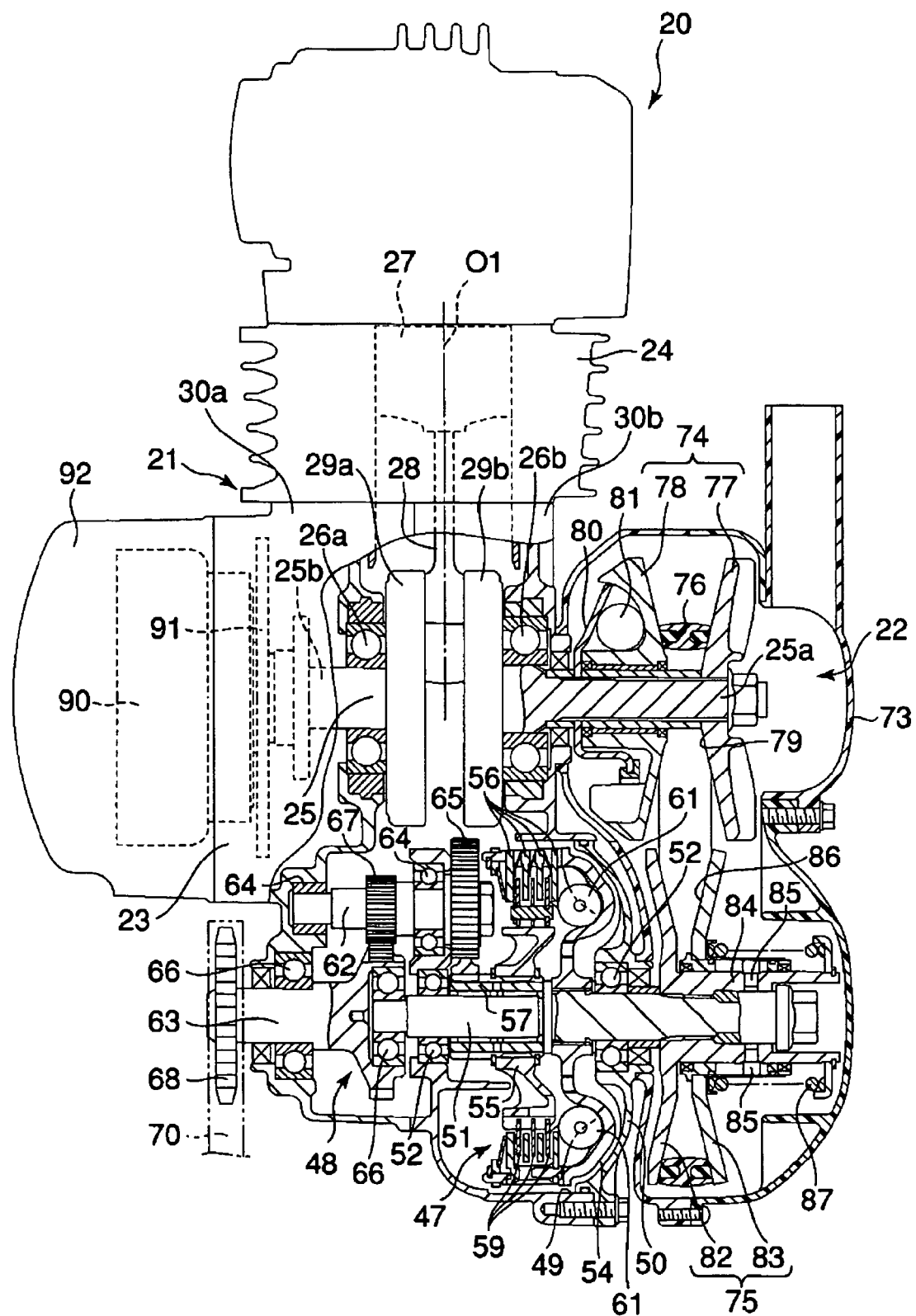
FIG. 7 is another partially sectioned view of the power unit that shows the internal structure of the power unit.

With reference now to FIG. 7, the illustrated engine 21 comprises a crankcase 23 and a cylinder 24 that is connected to the front end of the crankcase 23. The crankcase 23 houses a crankshaft 25. The crankshaft 25 can be supported in the crankcase 23 via bearings 26a, 26b. Preferably, the crankshaft 25 extends generally horizontally in the transverse direction of the vehicle.

In one configuration, the cylinder 24 preferably protrudes forward from a forward end of the crankcase 23 in a generally horizontal orientation such that it has an axis O1 that extends in a longitudinal direction of the power unit 20. The cylinder 24 houses a piston 27. The piston 27 is connected to crank webs 29a, 29b of the crankshaft 25 via a connecting rod 28.

With continued reference to FIG. 7, the crankcase 23 is made up of a first case block 30a and a second case block 30b. The first and second case blocks 30a, 30b are coupled with each other in any suitable manner. In the illustrated embodiment, the first and second case blocks 30a, 30b are split in the transverse direction of the motorcycle 1. In other words, substantially the entire first case block 30a is located on the left side of the axis O1 of the cylinder 24 and substantially the entire second case block 30b is located on the right side of the axis O1 of the cylinder 24.

With reference again to FIGS. 3 and 4, the crankcase 23 preferably is suspended from the main frame member 4 in any suitable manner. In the illustrated configuration, the crankcase 23 comprises a first and a second boss 32, 33. The first boss 32 protrudes upward from the forward end of a top face 23a of the crankcase 23. The second boss 33 protrudes upward from the rearward end of the top face 23a of the crankcase 23. Other configurations also are possible.

With reference to FIG. 5, the first boss 32 is interposed between the lower ends of the first engine brackets 12a, 12b. The first boss 32 can be formed integrally with the first and second case blocks 30a, 30b. In other configurations, the first boss 32 can be separately formed and attached to the case in any suitable manner. The illustrated first boss 32 comprises a generally transversely-extending through hole 34.

In the illustrated configuration, a pair of engine mount dampers 35 are fitted in the through hole 34. Each of the illustrated engine mount dampers 35 comprises an inner sleeve 36, an outer sleeve 37 that generally surrounds the inner sleeve 36, and a vibration absorbing rubber 38 that is interposed between the inner sleeve 36 and the outer sleeve 37. Any other suitable type of engine mount damper configuration also can be used.

The inner sleeves 36 of the paired engine mount dampers 35 preferably are sandwiched between the lower ends of the first engine brackets 12a, 12b. In the illustrated configuration, the inner sleeves 36 are in contact with each other in the through hole 34. Preferably, the inner sleeves 36 are arranged end to end and are in contact with each other. In other words, the inner sleeves 36 preferably are coaxially arranged to make contact with each other. The outer sleeves 37 can be press-fit in the through hole 34.

With continued reference to FIG. 5, a first engine mount bolt 39 extends between the lower ends of the first engine brackets 12a, 12b. The first engine mount bolt 39 preferably extends through the inner sleeves 36 of the engine mount dampers 35. A nut 40 secures the first engine mount bolt 39 in position. Thus, the first boss 32 in the illustrated embodiment is secured to the lower ends of the first engine brackets 12a, 12b and the forward end of the crankcase 23 is thereby suspended from the intermediate portion of the main frame member 4 via the first engine brackets 12a, 12b.

With reference again to FIG. 6, the second boss 33 preferably is interposed between the lower ends of the second engine brackets 14a, 14b. The second boss 33 can be formed integrally with the first case block 30a. In one embodiment, the second boss 33 is separately formed and suitably secure to the case. The second boss 33 preferably comprises a transversely-extending through hole 41. A second engine mount bolt 42 preferably extends between the lower ends of the second engine brackets 14a, 14b and through the through hole 41 of the second boss 33. A nut 43 secures the second engine mount bolt 42 in position. The second boss 33 is therefore secured to the lower ends of the second engine brackets 14a, 14b and the rear end of the crankcase 23 is thereby suspended from the rear end of the main frame member 4 via the second engine brackets 14a, 14b.

Preferably, the rear end of the crankcase 23 is interposed between the rear arm brackets 13a, 13b. The lower rear end of the crankcase 23 can be secured to the lower ends of the rear arm brackets 13a, 13b via a bolt 44. Other suitable mounting arrangements also can be used.

With reference to FIGS. 3 and 4, a space S advantageously is defined between the portion of the main frame member 4 that supports the crankcase 23 and the top face 23a of the crankcase 23. As illustrated in FIG. 1, the main frame member 4 preferably is inclined downward as it extends rearward from the steering head pipe 3. Preferably, the forward portion of the top face 23a of the crankcase 23 slopes in the opposite direction (i.e., is inclined downward in a forward direction).

The opposing slopes of the main frame member 4 and the forward portion of the top face 23a of the crankcase 23 increase the spacing between the forward portion of the top face 23a of the crankcase 23 and the main frame member 4. The space S thereby widens between the main frame member 4 and the crankcase 23 in the forward direction when the motorcycle 1 is viewed from the side. In the illustrated embodiment, the first boss 32 of the crankcase 23 and the first engine brackets 12a, 12b are located at the widest part of the space S. Accordingly, an enlarged open space is provided.

With reference now to FIGS. 6 and 7, the illustrated crankcase 23 houses a centrifugal clutch 47 and a gear transmission 48. The centrifugal clutch 47 is located to the rear in the second case block 30b of the illustrated crankcase 23. The second case block 30b comprises an opening 49 through which the centrifugal clutch 47 can be put inserted and removed from the crankcase 23. The opening 49 opens at a right side face toward the rear of the second case block 30b. The opening 49 can be closed by a clutch cover 50.

The centrifugal clutch 47 can be supported on an output shaft 51. In the illustrated embodiment, the output shaft 51 is supported by the clutch cover 50 and the second case block 30b via bearings 52. Preferably, the output shaft 51 extends generally parallel to the crankshaft 25. The right end of the output shaft 51 passes through the clutch cover 50 and protrudes to the right of the illustrated crankcase 23.

The centrifugal clutch 47 comprises a cylindrical clutch housing 54 and a clutch boss 55. The clutch housing 54 is supported on the output shaft 51 and is coupled for rotation with the output shaft 51. The clutch housing 54 supports a plurality of ring-shaped clutch plates 56. The clutch plates 56 are rotatable together with the clutch housing 54 and are arranged generally coaxially in the axial direction of the output shaft 51 with intervals therebetween. In other words, the clutch plates 56 are separated by a small distance from each other such that spaces are defined between the clutch plates 56.

The clutch boss 55 preferably is located inside the clutch plates 56. The output shaft 51 preferably extends through the center of the clutch boss 55. A generally cylindrical intermediate shaft 57 preferably is interposed between the clutch boss 55 and the output shaft 51. The intermediate shaft 57 can be rotationally supported on the output shaft 51. The intermediate shaft 57 engages with the clutch boss 55 to rotate therewith.

The clutch boss 55 supports a plurality of ring-shaped friction plates 59. The friction plates 59 are rotatable together with the clutch boss 55 and interposed between the clutch plates 56. In other words, the friction plates 59 can be positioned in the spaces defined between the clutch plates 56.

The clutch housing 54 comprises a plurality of cam faces 60. Roller weights 61 are interposed between the cam faces 60 and one of the clutch plates 56 that faces the cam faces 60. The roller weights 61 are moved in the radial direction of the clutch housing 54 in proportion to the centrifugal force generated by the rotation of the clutch housing 54. More specifically, when the centrifugal force applied to the roller weights 61 reaches a predetermined value, the roller weights 61 start moving radially outward along the cam faces 60 and press against the clutch plates 56. As a result, the clutch plates 56 and the friction plates 59 are brought into pressure contact with each other and the centrifugal clutch 47 is shifted to a clutch-in state to permit transmission of torque.

When the centrifugal force applied to the roller weights 61 decreases, the roller weights 61 move radially inward along the cam faces 60. Then, the pressure contact between the clutch plates 56 and the friction plates 59 is gradually reduced and, when sufficient pressure has been released, the centrifugal clutch 47 is shifted to a clutch-off state to disconnect the transmission of torque.

The illustrated gear transmission 48 is located at the output end of the centrifugal clutch 47. The gear transmission 48 preferably comprises a first speed changing shaft 62 and a second speed changing shaft 63. The first speed changing shaft 62 is supported by a rear part of the crankcase 23 via a plurality of bearings 64. An input gear 65 is secured to the right end of the first speed changing shaft 62. The input gear 65 engages the intermediate shaft 57. Because of the meshing engagement, the clutch boss 55 of the centrifugal clutch 47 and the first speed changing shaft 62 rotate together.

In the illustrated configuration, the second speed changing shaft 63 is supported by a rear part of the crankcase 23 and the left end of the output shaft 51 via bearings 66. The second speed changing shaft 63 extends coaxially with the output shaft 51. A speed changing gear train 67, which comprises gears that mesh with each other, is interposed between the first and second speed changing shafts 62, 63. The torque of the first speed changing shaft 62 is transmitted to the second speed changing shaft 63 via the speed changing gear train 67.

The left end of the second speed changing shaft 63 protrudes to the left of the crankcase 23. A drive sprocket 68 is secured to the left end of the second speed changing shaft 63. A chain 70 is wrapped around the drive sprocket 68 and a driven sprocket 69 of the rear wheel 16.

With reference to FIG. 7, the illustrated CVT 22 is positioned along the right side face of the second case block 30b of the crankcase 23. The CVT 22 comprises a CVT case 73, a primary sheave 74, a secondary sheave 75, and a belt 76.

The illustrated CVT case 73 comprises a hollow box-like shape. The CVT case 73 extends in the longitudinal direction of the power unit 20. A journal portion 25a at the right end of the crankshaft 25 and the right end of the output shaft 51 preferably extend into the CVT case 73. The CVT case 73 houses the primary sheave 74, the secondary sheave 75, and the belt 76.

The primary sheave 74 is located at the front end in the CVT case 73 and supported on the journal part 25a at the right end of the crankshaft 25. The primary sheave 74 comprises a fixed sheave half 77 and a movable sheave half 78. The fixed sheave half 77 is secured to the end of the journal part 25a and rotatable together with the crankshaft 25. The movable sheave half 78 is supported with the journal part 25a to be slidable toward and away from the fixed sheave half 77 and rotatable in a circumferential direction of the journal part 25a.

A first belt groove 79 is formed between the fixed sheave half 77 and the movable sheave half 78. The width of the first belt groove 79 is adjustable by sliding the movable sheave half 78.

A cam plate 80 is fixed on the journal part 25a. The cam plate 80 is rotatable together with the crankshaft 25 and faces to the movable sheave half 78. The cam plate 80 and the movable sheave half 78 are rotatable together and movable toward and away from each other.

A plurality of roller weights 81 (only one of them is shown) are interposed between the cam plate 80 and the movable sheave half 78. The roller weights 81 are moved in the radial direction of the cam plate 80 in proportion to the centrifugal force generated by the rotation of the crankshaft 25. This movement causes the movable sheave half 78 to slide in the axial direction of the journal part 25a and the width of the first belt groove 79 is varied.

The secondary sheave 75 is located at the rear end in the CVT case 73 and supported on the right end of the output shaft 51. The secondary sheave 75 has a fixed sheave half 82 and a movable sheave half 83. The fixed sheave half 82 has a cylindrical collar 84 around its center of rotation. The collar 84 engages with the right end of the output shaft 51 so as to be rotatable together with the output shaft 51. The movable sheave half 83 is mounted on the collar 84 for sliding movement in the axial direction and engages with the collar 84 via a plurality of engaging pins 85. Thus, the movable sheave half 83 is rotatable together with the fixed sheave half 82 and movable toward and away from the fixed sheave half 82.

A second belt groove 86 is formed between the fixed sheave half 82 and the movable sheave half 83. The width of the second belt groove 86 is adjustable by sliding the movable sheave half 83. The movable sheave half 83 is urged in a direction to reduce the width of the second belt groove 86 by a compression coil spring 87.

As shown in FIG. 3, a diameter R1 of the primary sheave 74 preferably is smaller than a diameter R2 of the secondary sheave 75. Thus, the top face 73a of the CVT case 73 inclines downward as it extends from the rear end of the CVT case 73 toward the front end thereof. The top face 73a of the CVT case 73 is inclined along the front half of the top face 23a of the crankcase 23 and is located slightly below the top face 23a, when the motorcycle 1 is viewed from the side.

The belt 76 transmits the torque of the primary sheave 74 to the secondary sheave 75. The belt 76 is stretched between the first belt groove 79 of the primary sheave 74 and the second belt groove 86 of the secondary sheave 75. Other endless transmitters also can be used (e.g., chains, steel belts, rubber belts, etc.).

When the rotational speed of the crankshaft 25 is low, such as when the engine 21 is idling, the roller weights 81 are positioned close to the center of rotation of the primary sheave 74. Thus, the movable sheave half 78 is positioned farthest away from the fixed sheave half 77 and the diameter at which the belt 76 rides on the primary sheave 74 is minimized. Simultaneously, the movable sheave half 83 of the secondary sheave 75 is pushed to a position closest to the fixed sheave half 82 by the compression coil spring 87. Thus, the belt 76 entrained around the second belt groove 86 has been pushed toward the outer periphery of the secondary sheave 75 and the diameter at which the belt 76 rides on the secondary sheave 75 is maximized. Therefore, the CVT 22 reaches its maximum transmission ratio.

As the rotational speed of the crankshaft 25 increases, the centrifugal force applied to the roller weights 81 increases. Thus, the roller weights 81 start moving radially outward along the movable sheave half 78. This movement causes the movable sheave half 78 to slide toward the fixed sheave half 77 and the width of the first belt groove 79 decreases. As a result, the belt 76 is pushed radially outward along the primary sheave 74 and the diameter at which the belt 76 rides on the primary sheave 74 increases.

On the secondary sheave 75, the belt 76 is pulled toward the center of rotation of the secondary sheave 75. The movable sheave half 83 therefore slides away from the fixed sheave half 82, against the urging force of the compression coil spring 87, and the width of the second belt groove 86 increases. Thus, the diameter at which the belt 76 rides on the secondary sheave 75 decreases. Then, the transmission ratio of the CVT 22 decreases, and, when the diameter at which the belt 76 rides on the primary sheave 74 reaches the maximum value, the transmission ratio of the CVT 22 is minimized.

The torque transmitted from the primary sheave 74 to the secondary sheave 75 is transmitted from the fixed sheave half 82 of the secondary sheave 75 to the clutch housing 54 of the centrifugal clutch 47 via the output shaft 51. The centrifugal clutch 47 is shifted to a clutch-on state when the centrifugal force applied to the roller weights 61 by the clutch housing 54 reaches a prescribed value. As a result, the torque of the engine 21 is transmitted from the clutch housing 54 to the gear transmission 48 via the intermediate shaft 57 and then to the rear wheel 16 via the chain 70.

With reference to FIG. 7, an alternating-current magneto generator 90 and a starter gear 91 are mounted on a journal part 25b at the left end of the crankshaft 25. The alternating-current magneto generator 90 and the starter gear 91 are located on the left of the first case block 30a. The alternating-current magneto generator 90 is covered with a case cover 92. The case cover 92 is secured to the left side face of the front half of the first case block 30a.

Figure 8:
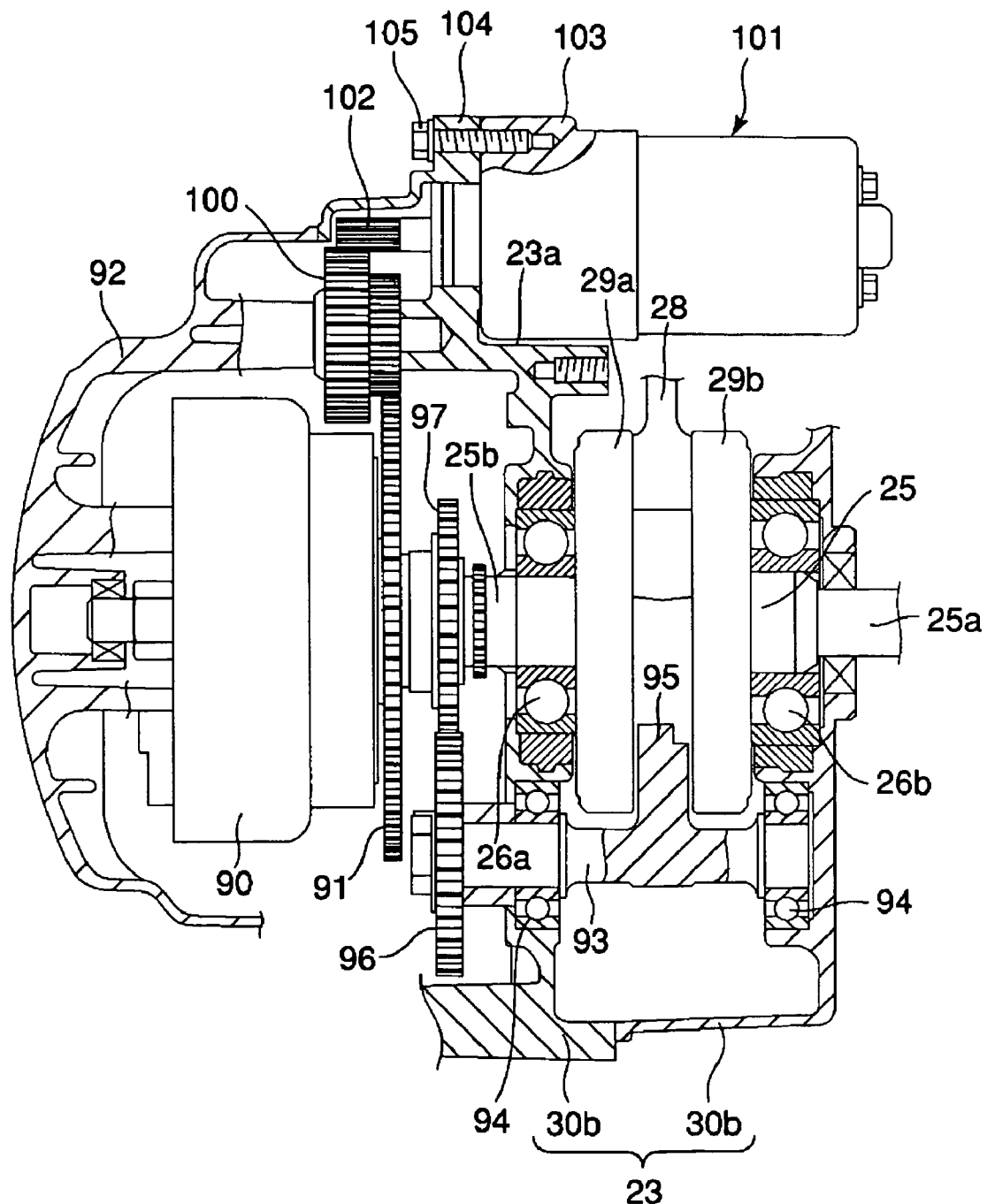
FIG. 8 is a further partially sectioned view of the power unit that shows the relative positions of a crankshaft, a starter motor and a balancer shaft.

With reference to FIG. 4 and FIG. 8, a balancer shaft 93 is housed in the crankcase 23. The balancer shaft 93 is located above the crankshaft 25 and in parallel with the crankshaft 25. The balancer shaft 93 extends across the first and the second case block 30a, 30b, which support the balancer shaft 93 via bearings 94. The balancer shaft 93 has a balance weight 95 having any suitable size, shape or configuration. In the illustrated configuration, the balance weight 95 is in the shape of a wedge. The balance weight 95 can pass through a space between the crank webs 29a, 29b of the crankshaft 25.

The left end of the balancer shaft 93 passes through the first case block 30a and extends left thereof. A first driving gear 96 is secured to the left end of the balancer shaft 93. The first driving gear 96 is in meshing engagement with a second driving gear 97 secured to the journal part 25b of the crankshaft 25. Thus, the balancer shaft 93 advantageously counter rotates relative to the crankshaft 25. Preferably, the first and second driving gears 96, 97 have the same size and number of teeth such that the gears 96, 97 rotate at generally the same speed.

With reference to FIG. 3 and FIG. 4, the illustrated crankcase 23 comprises a protrusion 98 that is raised from the top face 23a of the crankcase 23. The protrusion 98 accommodates the balance weight 95 and, therefore, is located directly adjacent the balancer shaft 93. The protrusion 98 extends into the space S defined between the top face 23a of the crankcase 23 and the main frame member 4. The protrusion 98 preferably is positioned in the space S at a location generally behind a starter motor 101. Thus, while the protrusion 98 is positioned on the top face 23a of the crankcase 23, the main frame member 4 need not be displaced upward such that the main frame member 4 can be positioned closer to the ground.

The starter gear 91 meshes with a rotational shaft 102 of the starter motor 101 via a reduction gear 100. The starter motor 101 is an example of an auxiliary component of an engine 21 and can be located directly above the crankshaft 25. Other auxiliary components also can be used. For instance, in the case an electric CVT having a motor-driven movable sheave half of a primary sheave, a control motor of the movable sheave half can be the auxiliary component. As will be explained, the auxiliary component may be located between the top face of the case and the main frame member.

The illustrated starter motor 101 comprises a cylindrical motor housing 103. The motor housing 103 supports the rotational shaft 102 and houses a rotor and a stator (not shown). The motor housing 103 and the space S are advantageously sized and configured to accommodate the starter motor 101 within the space S.

In the illustrated configuration, the first case block 30a of the crankcase 23 comprises a motor support portion 104 at its upper forward end. Advantageously, the motor support portion 104 is located immediately behind a connecting portion of the first engine brackets 12a, 12b and the first boss 32. As mentioned above, the space S is expanded in this region. The motor support portion 104 extends upward from the top face 23a of the crankcase 23 in the illustrated configuration. The motor housing 103 of the starter motor 101 can be secured to the motor support portion 104 via a bolt 105.

In one configuration, the starter motor 101 is disposed generally vertically above the crankshaft 25. Preferably, the starter motor 101 is disposed in a generally horizontal attitude. More preferably, the starter motor 101 extends transversely relative to the vehicle (i.e., side to side). In the illustrated configuration, when the motorcycle 1 is viewed from the right side, as shown in FIG. 3, the starter motor 101 is positioned directly above the primary sheave 74 of the CVT 22. As illustrated, the starter motor 101 is exposed above the top face 23a of the crankcase 23.

In other words, the starter motor 101 is disposed in the space S defined between the top face 23a of the crankcase 23 and the main frame member 4. Moreover, in the illustrated configuration, the starter motor 101 is located between the first boss 32 and the protrusion 98, and the front end of the motor housing 103 of the starter motor 101 is interposed between the first engine brackets 12a, 12b. Thus, the connecting portion of the first engine brackets 12a, 12b and the first boss 32, and the starter motor 101 are positioned in the space S and generally aligned in the longitudinal direction of the vehicle body.

As illustrated, the starter motor 101 advantageously is located in the space S defined between the main frame member 4 and the top face 23a of the crankcase 23. Moreover, in the illustrated construction, the starter motor 101 is positioned rearward of the first engine brackets 12a, 12b, which location removes the start motor 101 from the region of the first engine brackets 12a, 12b. Accordingly, the starter motor 101 can be accommodated in the dead space created above the crankcase 23 that results from the advantageous configuration of the engine so that the main frame member 4 need not be displaced upward to accommodate the auxiliary component, such as the starter motor 101. This allows the main frame member 4 to be lowered to the lowest possible position based upon the desired amount of ground clearance for the power unit 20, thereby lowering the position of the seat 10 on the main frame member 4. Thus, the rider can get on and off the motorcycle easily.

As described above, the top face 23a of the crankcase 23 advantageously is inclined downward in a forward direction, which increases the distance from the main frame member 4 in the forward direction of the top face 23a. The top face 73a of the CVT case 73 on the right side of the crankcase 23 also inclines downward as the top face 73a extends forward. Thus, the space S defined between the main frame member 4 and the top face 23a of the crankcase 23 widens in the forward direction of the vehicle body. As a result, such a sufficiently large space S is provided between the main frame member 4 and the crankcase 23 without elevating the main frame member 4 and without lowering the mounting position of the power unit 20. Accordingly, the first engine brackets 12a, 12b and the starter motor 101, or any other desired auxiliary component, can be easily accommodated in the space S.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A motorcycle comprising a steering head pipe, a backbone type frame comprising a single main frame member extending rearward from the steering head pipe, the main frame member being centrally positioned in a vehicle width direction of the motorcycle, a power unit comprising a case, the case being suspended from the main frame member, the case of the power unit comprising a top face, the top face being spaced from the main frame member along a longitudinally-extending segment of the main frame member and a functional component of the power unit being located right below the main frame member and between the top face of the case and the main frame member, at least a portion of the functional component comprising an axial rotational shaft that is oriented at a substantially right angle relative to the longitudinally-extending segment of the main frame member.

2. The motorcycle of claim 1, wherein the top face of the case is inclined downward as the top face extends forward of the main frame member.

3. The motorcycle of claim 1, wherein the main frame member inclines downward in a rearward direction, the main frame member and the top face of the case defining a space that is enlarged toward the front of the longitudinally-extending segment of the main frame member, and the functional component is located in the space.

4. The motorcycle of claim 3, wherein the power unit further comprises an engine, the engine comprising a cylinder and a crankshaft, the crankshaft being positioned within the case, the cylinder projecting forward of a forward end of the case, and the functional component comprising a starter motor, the starter motor extending in the vehicle width direction at a location generally above the crankshaft.

5. The motorcycle of claim 4, wherein the power unit further comprises a belt-driven continuously variable transmission mounted to the engine, the continuously variable transmission comprising a primary sheave driven by the crankshaft of the engine, a secondary sheave located rearward of the primary sheave, the primary sheave having a smaller diameter than the secondary sheave, a belt connecting the primary sheave to the secondary sheave, and the primary sheave, the secondary sheave and the belt being positioned within a CVT case, and the CVT case comprising the top face that inclines downward as the top face extends from a proximity of the secondary sheave to a proximity of the primary sheave.

6. The motorcycle of claim 5, wherein the starter motor is located generally vertically above the primary sheave.

7. The motorcycle of claim 4, wherein the engine comprises a balancer shaft, the balancer shaft is positioned in an upper space within the case, and the top face of the case comprises a protrusion, and the protrusion extends into the space between the top face and the main frame member at a position that generally corresponds to the position of the balancer shaft.

8. The motorcycle of claim 3, wherein the top face of the case is inclined downward as the top face extends forward of the main frame member.

9. The motorcycle of claim 3, wherein the case comprises a boss portion positioned along the top face, a bracket suspending the boss portion from the longitudinally-extending segment of the main frame member, and the boss portion protruding into the space and being located forward of the functional component.

10. The motorcycle of claim 9, wherein the top face of the case is inclined downward as the top face extends forward of the main frame member.

11. The motorcycle of claim 9, wherein the boss portion is at a forward end of the top face.

12. The motorcycle of claim 11, wherein the top face of the case is inclined downward as the top face extends forward of the main frame member.

13. The motorcycle of claim 1, wherein the power unit further comprises an engine, the engine comprising a cylinder and a crankshaft, the crankshaft being positioned within the case, the cylinder projecting forward of a forward end of the case, and the functional component comprising a starter motor, the starter motor extending in the vehicle width direction at a location generally above the crankshaft.

14. The motorcycle of claim 13, wherein the power unit further comprises a belt-driven continuously variable transmission mounted to the engine, the continuously variable transmission comprising a primary sheave driven by the crankshaft of the engine, a secondary sheave located rearward of the primary sheave, the primary sheave having a smaller diameter than the secondary sheave, a belt connecting the primary sheave to the secondary sheave, and the primary sheave, the secondary sheave and the belt being positioned within a CVT case, and the CVT case comprising the top face that inclines downward as the top face extends from a proximity of the secondary sheave to a proximity of the primary sheave.

15. the motorcycle of claim 14, wherein the starter motor is located generally vertically above the primary sheave.

16. The motorcycle of claim 13, wherein the engine comprises a balancer shaft, the balancer shaft is positioned in an upper space within the case, and the top face of the case comprises a protrusion, and the protrusion extends into the space between the top face and the main frame member at a position that generally corresponds to the position of the balancer shaft.

17. A motorcycle comprising a steering head pipe, a backbone type frame comprising a single main frame member extending rearward from the steering head pipe, the main frame member being centrally positioned in a vehicle width direction of the motorcycle, the main frame member comprising a forward-facing side, a power unit comprising an auxiliary component and a case, the case being located generally vertically below the main frame member, the case comprising a top face, the top face comprising a front portion, the case of the power unit and the main frame member together defining a space that expands toward the forward-facing side of the main frame member, the front portion of the top face of the case facing the space and being formed with a boss, the boss being suspended from the main frame member, and the auxiliary component being positioned right below the main frame member and within the space, at least a portion of the auxiliary component comprising an axis of rotation that is oriented at a substantially right angle relative to a longitudinally-extending segment of the main frame member.

18. The motorcycle according to claim 17, wherein the auxiliary component extends in the vehicle width direction of the motorcycle and is located rearward of the boss.

19. The motorcycle of claim 17, wherein the power unit further comprises a v-belt type continuously variable transmission and the transmission is disposed to one side of the motorcycle and extends in the vehicle width direction of the motorcycle.

20. The motorcycle of claim 19, wherein the auxiliary component is separately disposed on an opposite side of the motorcycle in the vehicle width direction of the motorcycle relative to the transmission.

21. The motorcycle of claim 1, wherein the power unit further comprises a v-belt type continuously variable transmission and the transmission is disposed to one side of the motorcycle and extends in the vehicle width direction of the motorcycle.

22. The motorcycle of claim 21, wherein the functional component is separately disposed on an opposite side of the motorcycle in the vehicle width direction of the motorcycle relative to the transmission.

* * * * *